United States Patent
Bacon, Jr. et al.

[11] Patent Number: 6,127,020
[45] Date of Patent: Oct. 3, 2000

[54] METHOD OF MAKING WET RETROREFLECTIVE MARKING MATERIAL

[75] Inventors: Chester A. Bacon, Jr., Oakdale; Louis C. Belisle, deceased, late of Oakdale, both of Minn., by Sharon R. A. Guthrie, legal representative; Larry K. Stump, Hudson, Wis.; Terry R. Bailey, Woodbury, Minn.; T. Ian Bradshaw, Port Ludlow, Wash.; Dale H. Haunschild, Hudson, Wis.; Gregory F. Jacobs, Woodbury, Minn.

[73] Assignee: 3M Innovative Properties Company, St. Paul, Minn.

[21] Appl. No.: 09/307,114

[22] Filed: May 7, 1999

Related U.S. Application Data

[62] Division of application No. 08/672,143, Jun. 27, 1996, abandoned.
[60] Provisional application No. 60/000,708, Jun. 29, 1995, and provisional application No. 60/000,706, Jun. 29, 1995.

[51] Int. Cl.[7] ............................. G02B 5/12; E01F 9/00; B32B 5/16
[52] U.S. Cl. ........................ 428/161; 428/166; 428/141; 428/143; 428/156; 428/163; 428/325; 428/220; 428/343; 428/168; 428/169; 428/162; 359/529; 359/531; 359/532; 359/533; 359/534; 359/537; 404/14; 404/9; 404/12; 404/16; 427/137; 427/163.4; 156/196; 156/212; 156/213
[58] Field of Search .................................. 428/166, 141, 428/143, 156, 161, 162, 163, 325, 220, 343, 168, 169; 427/137, 163.4; 404/14, 9, 12, 16; 359/529, 531, 532, 533, 534, 537; 156/196, 212, 213

[56] References Cited

U.S. PATENT DOCUMENTS

| | | |
|---|---|---|
| 2,897,733 | 8/1959 | Shuger .......................................... 94/1.5 |
| 3,920,346 | 11/1975 | Wyckoff ..................................... 404/14 |
| 4,025,159 | 5/1977 | McGrath ................... 350/105 |
| 4,025,195 | 5/1977 | Ebersole et al. ........................... 356/71 |
| 4,040,760 | 8/1977 | Wyckoff ................................... 359/551 |
| 4,072,403 | 2/1978 | Eigenmann ............................. 350/105 |
| 4,145,112 | 3/1979 | Crone et al. ............................. 350/103 |
| 4,236,788 | 12/1980 | Wyckoff ................................... 350/97 |
| 4,505,967 | 3/1985 | Bailey ....................................... 428/164 |
| 4,564,556 | 1/1986 | Lange ....................................... 428/325 |
| 4,648,689 | 3/1987 | May ......................................... 350/105 |
| 4,664,966 | 5/1987 | Bailey et al. ............................. 428/203 |
| 4,681,401 | 7/1987 | Wyckoff ................................... 404/14 |
| 4,712,867 | 12/1987 | Malek ....................................... 350/103 |

(List continued on next page.)

FOREIGN PATENT DOCUMENTS

| | | |
|---|---|---|
| 385 746 B1 | 9/1990 | European Pat. Off. .......... E01F 9/04 |
| 835 349 B1 | 4/1998 | European Pat. Off. .......... E01F 9/04 |
| 9401987 | 4/1994 | Germany . |
| 44334659 | 4/1995 | Germany . |
| WO93/21388 | 10/1993 | WIPO . |
| WO97/01677 | 1/1997 | WIPO . |
| WO97/01679 | 1/1997 | WIPO . |
| WO99/04096 | 1/1999 | WIPO . |
| WO99/04099 | 1/1999 | WIPO . |

OTHER PUBLICATIONS

ASTM E 97–77
ASTM E 303

*Primary Examiner*—William P. Watkins, III
*Attorney, Agent, or Firm*—Yen Tong Florczak

[57] ABSTRACT

A method of making a retroreflective marking material is provided, the method has the steps of: (a) providing an enclosed-lens retroreflective sheet having a top surface and a bottom surface and comprising a cover layer and a monolayer of retroreflective elements; (b) applying a conformance layer to the bottom surface of the retroreflective sheet; and (c) laminating a configuration member to the conformance layer thereby creating first portions and second portions in the sheet, the first portions being arranged in an upwardly contoured profile and the second portions being arranged in a lower, substantially planar position. A retroreflective article made by the method is also provided.

20 Claims, 1 Drawing Sheet

U.S. PATENT DOCUMENTS

| | | | |
|---|---|---|---|
| 4,875,798 | 10/1989 | May | 404/12 |
| 4,875,799 | 10/1989 | Harrison | 404/12 |
| 5,127,973 | 7/1992 | Sengupta | 156/60 |
| 5,257,491 | 11/1993 | Rouyer | 53/428 |
| 5,268,789 | 12/1993 | Bradshaw | 359/534 |
| 5,277,513 | 1/1994 | Flanagan et al. | 404/16 |
| 5,340,231 | 8/1994 | Steere et al. | 404/14 |
| 5,417,515 | 5/1995 | Hachey et al. | 404/15 |
| 5,450,235 | 9/1995 | Smith et al. | 359/529 |
| 5,539,033 | 7/1996 | Bredahl et al. | 525/270 |
| 5,550,175 | 8/1996 | Bredahl et al. | 523/348 |
| 5,605,761 | 2/1997 | Burns et al. | 428/412 |
| 5,677,050 | 10/1997 | Bilkaldi et al. | 428/331 |
| 5,679,437 | 10/1997 | Hackworth et al. | 428/143 |
| 5,691,847 | 11/1997 | Chen | 359/565 |
| 5,706,132 | 1/1998 | Nestegaard et al. | 359/529 |
| 5,774,265 | 6/1998 | Mathers et al. | 359/539 |

METHOD OF MAKING WET RETROREFLECTIVE MARKING MATERIAL

This application is a divisional of U.S. patent application Ser. No. 08/672,143, filed Jun. 27, 1996 abandoned, which claims priority from U.S. Provisional application Ser. Nos. 60/000,708 and 60/000,706, both filed on Jun. 29, 1995.

FIELD OF INVENTION

The present invention relates to retroreflective material that exhibits good retroreflective brightness when wet and good retroreflective brightness at high entrance angles.

BACKGROUND

Pavement markings, such as those on the centerline and edgeline of a roadway, are important in order to provide visual guidance for motor vehicle drivers. Pavement marking materials are used as traffic control markings for a variety of uses, such as short distance lane striping, stop bars, and pedestrian pavement markings at intersections and long line lane markings, etc. on roadways. A common form of pavement marking material is adhesive-backed tape that is applied to the roadway surface in desired location and length; the top surface of the tape having selected color and typically retroreflective characteristics.

Currently, many flat pavement markings typically rely on an exposed-lens optical system comprising transparent microspheres partially embedded in a binder layer containing reflective pigment particles such as titanium dioxide ($TiO_2$) or lead chromate ($PbCrO_4$) as the retroreflector mechanism. In use, light from the headlamp of a vehicle enters the microsphere and is refracted to fall on the reflective pigment. Some portion of the light is returned generally along the original entrance path in the direction of the vehicle so as to be visible to the driver. The amount of refraction and the amount of light gathering of these microspheres is dependent in part upon maintaining a low index of refraction air interface on the exposed portion of the microsphere. During rainy periods, the microspheres become wetted with water which reduces their light refracting ability resulting in much reduced retroreflective performance.

It is also known to use enclosed-lens retroreflective structures on pavement markings. See, e.g., U.S. Pat. Nos. 5,277,513 (Flanagan et al.) and 5,340,231 (Steere et al.). Enclosed-lens retroreflective sheetings with flat cover films (also sometimes referred to as top films, top sheets, cover sheets, etc.) have been constructed as a means for providing effective retroreflection under wet conditions. See, e.g., U.S. Pat. No. 4,025,159 (McGrath) which discloses encapsulated-lens retroreflective articles and U.S. Pat. Nos. 4,505,967 (Bailey) and 4,664,966 (Bailey et al.) which disclose embedded-lens retroreflective articles.

Currently available low profile pavement markings provide effective retroreflective response for only a narrower range of entrance angles than is sometimes desired. For example, flat pavement markings, relying on microspheres partially embedded in layers containing diffuse pigments as described above, are most easily seen at distances of approximately 80 meters and less. At distances greater than this, retroreflective brightness declines due in part to the relatively larger entrance angles of the incident light and in part to inherently limited retroreflective brightness. In addition to generally low retroreflectivity at high incidence angles, flat pavement markings are particularly difficult to see under rainy conditions for the reasons discussed above.

Raised pavement markings typically have better wet reflectivity because the rain will run off the raised portions and they sometimes use reflective systems that are inherently retroreflective when wet. However, snow removal is frequently a problem on roads bearing raised pavement markings, as the snowplows have a tendency to catch on the raised protrusions and dislodge the markings from the road surface. Also, raised pavement markings mounted as spot delineators provide relatively poor daytime road delineation and thus commonly need to be augmented with continuous painted or tape line markings.

To expand the effective entrance angle range of a pavement marking material, combination of a light directing means with an enclosed-lens retroreflector has been proposed. For example, U.S. Pat. No. 4,145,112 (Crone) discloses an article comprising an underlying base retroreflective layer and a light directing layer comprised of a longitudinally-extending series of short transparent projections. U.S. Pat. No. 4,236,788 (Wyckoff) discloses a related type of pavement marker strip wherein the two sides of the transverse prisms are adjusted to provide for downward internal reflection into the base sheet from one side and refraction to the space between successive prisms into the base sheet from the other side. U.S. Pat. No. 3,920,346 (Wyckoff) discloses a saw-tooth-like marker strip comprising protrusions with curved edges and having upwardly disposed retroreflective members embedded therein.

U.S. Pat. No. 4,072,403 (Eigenmann) discloses a retroreflective assembly that is particularly useful for situations in which retroreflection is required in rainy conditions. The assembly disclosed therein comprises a transparent globule with a monolayer of transparent microspheres on certain portions of the globule and a reflective layer disposed behind the microspheres. The retroreflective assemblies, sometimes referred to as "globule/microsphere retroreflective assemblies", are positioned on the top surface of a pavement marking where they provide effective retroreflection of light at high incidence angles. U.S. Pat. No. 5,268,789 (Bradshaw) discloses an improved retroreflective assembly of this type and an improved method for making such an assembly.

EP Patent No. 385746 B1 (Kobayashi et al.) discloses a pavement marking comprising a layer of large glass microspheres embedded in the top of retroreflective embedded-lens type base sheeting. The retroreflective pavement marking is said to be particularly useful in rainy conditions because the larger glass microspheres are partially exposed in air.

The need exists for low profile retroreflective articles that exhibit high retroreflective brightness even at high incidence angles, that retain effective retroreflective brightness at high incidence angles even when wet, and that are durable. In addition, there exists a need for retroreflective articles exhibiting effective retroreflective response over a wide range of entrance angles for application to vertical surfaces such as guard rails, Jersey barriers, etc.

SUMMARY OF INVENTION

The present invention provides novel materials that exhibit surprisingly effective retroreflective properties. Materials of the invention exhibit surprisingly bright retroreflective performance at very high entrance angles (e.g., 88° or more) and at low entrance angles, under both wet and dry conditions, and are well suited for use on vertical and horizontal surfaces. The invention also provides a method for making such materials. A glossary of some of the terms used in this application appears at the end of this specification. Much of the following description is made with specific reference to embodiments of the invention to be used as pavement marking materials. It will be understood that many aspects of such embodiments will also be relevant to embodiments used as markings on vertical surfaces.

In brief summary, in some embodiments, pavement marking materials of the invention comprise on the top surface thereof an enclosed-lens retroreflective sheet that comprises a cover layer and a monolayer of retroreflective elements wherein first portions of the monolayer are arranged in an upwardly contoured (i.e., normal to the general body or plane of the sheet) profile and second portions of the monolayer are arranged a lower, sometimes substantially planar position. Typically a material of the invention will comprise a plurality of such first portions and second portions in a single continuous sheet. An advantage of enclosed-lens retroreflective sheets is the resultant material is inherently wet retroreflective. That is, the inventive material will retroreflect during rainy conditions, when the rain has subsided but the article has not yet dried, in the early morning hours when dew has collected on the material, or under similar conditions.

Pavement marking materials of the invention provide exceptional retroreflective brightness under both dry and wet conditions. They are flexible and can be made in desired colors. In addition, the materials provided herein are low profile and conform to road surfaces very well. They are resistant to damage from traffic and withstand exposure to water, salt, oils, ultraviolet radiation, sand abrasion, high temperatures, etc. making them well suited for use on roads. They can be manufactured in continuous processes. When marking materials of the invention are applied to roads to provide traffic control markings, the delineations are more visible to motorists and thus improved safety is possible.

Retroreflective articles of the invention are particularly well suited for applications where light is incident at high entrance angles greater than about 85°, e.g., at pavement marking geometries. Such applications include pavement markings and applications where the incident light may be from any direction, such as horizontal signs. Illustrative examples of such horizontal signs include the legends and symbols commonly placed on pavement in parking lots to denote handicapped parking, and the arrows and lane markings placed on the pavement at an intersection.

In addition, retroreflective articles of the invention are also well suited for use on vertical surfaces, particularly those that are observed at high incidence angles such as guard rails, building walls along alleys, Jersey barriers, bridge abutments, posts, traffic barrels, etc. An advantage of retroreflective articles of the invention is that in addition to exhibiting improved retroreflective brightness at high incidence angles, they also exhibit high retroreflective brightness at lower entrance angles, e.g., within 30° to 40° of normal, in which signs are often observed. This makes articles of the invention especially well suited for use on walls and barriers along highways and other applications where a vehicle may approach the structure from a wide range of angles at which effective retroreflective brightness is desired. For example, a first road may have a vertical barrier disposed substantially parallel to a portion thereof and a second road may intersect the first road. If the barrier has an article of the present invention on the surface thereof, it will provide effective retroreflection to vehicles approaching the barrier on either road, thereby increasing safety. Retroreflective articles of the invention can be used in curved formats, e.g., wrapped around traffic cones and barrels, on curved guardrails, etc., providing excellent retroreflective brightness along essentially the entire visible portion because of the exceptional entrance angularity of the articles.

BRIEF DESCRIPTION OF DRAWING

The invention will be further explained with reference to the drawing, wherein.

These figures, which are idealized, are not to scale and are intended to be merely illustrative and non-limiting.

DETAILED DESCRIPTION OF ILLUSTRATIVE EMBODIMENTS

Figure 1:
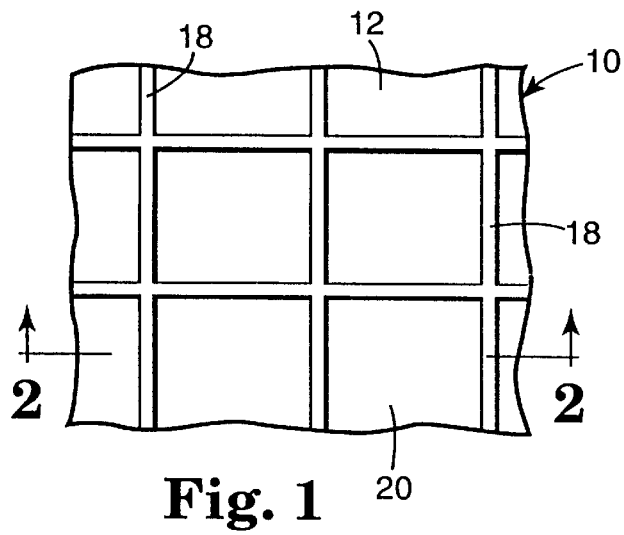
FIG. 1 is a plan view of a portion of an illustrative pavement marking material of the invention.
Figure 2:
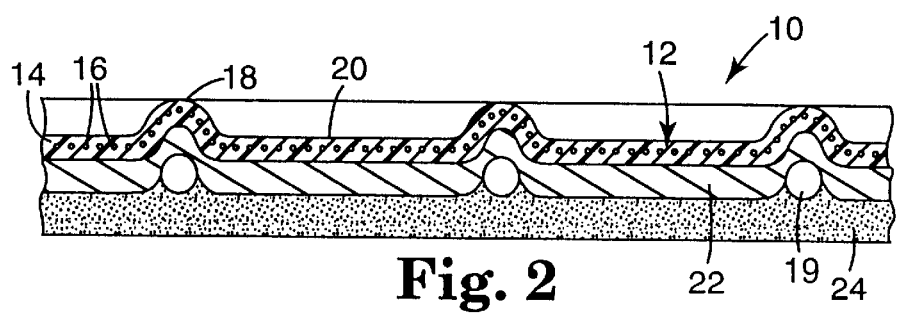
FIG. 2 is a cross section of the material shown in FIG. 1.

An illustrative marking material of the invention is shown in FIGS. 1 and 2. Material 10 comprises on top surface 12 thereof enclosed-lens retroreflective sheet 14 that comprises a monolayer of retroreflective elements 16 wherein first portions 18 of the monolayer are arranged in an upwardly contoured profile and second portions 20 of the monolayer are arranged a lower, sometimes substantially planar position. Marking material 10 further comprises optional conformance layer 22 and optional adhesive layer 24. In the embodiment shown, first portions 18 are elevated above second portions 20 by configuration member 19.

Figure 3:
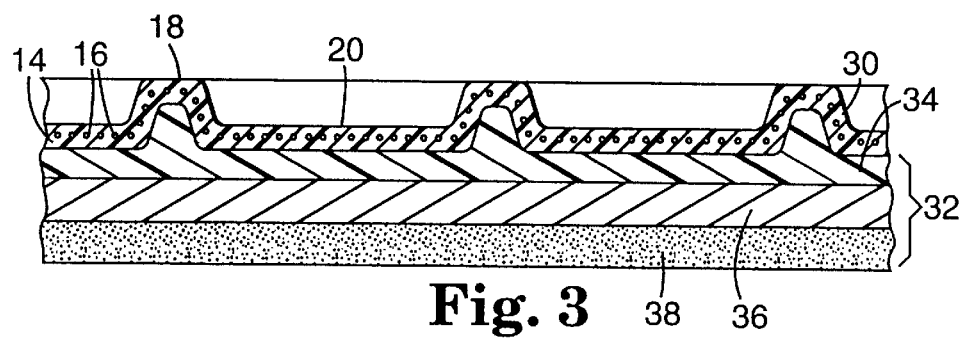
FIGS. 3 and 4 are cross sections of other illustrative pavement marking materials of the invention.

Another illustrative marking material is shown in FIG. 3. Suitable protrusions may be formed in the top major surface of backing 32, e.g., by embossing in a desired pattern, and retroreflective sheet 30 is conformed thereto. If desired, retroreflective sheet 30 may be embossed to desired profile and then back filled to yield the desired upwardly contoured profile. Backing 32 comprises configuration member 34 and typically optional conformance layer 36 and optionally adhesive layer 38.. As shown in FIG. 3, configuration member 34 is directly attached to retroreflective sheet 23. In some instances it will be useful to include a tie layer (not shown) between sheet 30 and backing 32. The tie layer should adhere well to the back of sheet 30 and the surface of backing 32. For example ethylene methacrylic acid will adhere to both aluminum and nitrile rubber layers. In an alternative embodiment, the conformance layer is directly attached to the bottom of the retroreflective sheet, followed by the configuration member and adhesive layer. The retroreflective sheet and configuration layer may be substantially coextensive, or may be not co-extensive as desired.

I. General Structure of the Inventive Article

Articles of the invention typically comprise a retroreflective sheet, configuration members, optional backing materials, and optional adhesive layer. The configuration member is used to impart the desired upwardly contoured portions to the article.

Typically in the case of pavement marking applications, the backing materials of the article will comprise a conformance layer and/or a scrim layer. For example, in FIG. 2, the backing comprises conformance layer 22. In FIG. 3, backing 32 comprises conformance layer 36, configuration member 34, and adhesive layer 38. If desired, the backing material may also comprise a scrim material to impart increased tear resistance, which allows a temporary pavement marking to be removable. Conformance layers (e.g., aluminum) and scrim layers are well known in the art. Suitable embodiments can be readily selected by those skilled in the art.

The inventive article may further comprise an optional adhesive layer adhered to the bottom side of the backing material such as adhesive layer 24 in FIG. 2. The adhesive provides a mechanism for attaching the retroreflective article to a surface, e.g., a roadway. If desired, a layer of adhesive or primer may be applied to the surface prior to laminating the retroreflective article. The criteria for suitable adhesive materials and primers will be dependent in part upon the nature of the sheeting and the intended application; suitable materials can be readily selected by those skilled in the art.

In some instances, it will be desired to partially embed skid control particles, sometimes referred to as anti-skid particles, in the upper surface of the retroreflective sheet to improve the traction of vehicles passing thereover. Anti-skid particles are well known in the art. Suitable embodiments can be readily selected by those skilled in the art.

Also, a thin, high abrasion resistance and/or dirt resistance coating may be applied to the top surface of the retroreflective article to protect it from traffic wear and dirt accumulation. Preferably, the coating will be light transmissive and will not reduce the skid resistance of the article.

Typically, pavement marking materials of the invention can be wound into roll form. In such instances it may be desired to use a release liner or apply a release treatment, e.g., silicone, to the top surface of the marking.

II. Retroreflective Sheets

Retroreflective sheets used in the invention preferably possess good angularity; that is, the sheets' retroreflectivity is still substantial at relatively high entrance angles of about 80° or more. All component layers of the retroreflective sheet preferably adhere together in all types of weather conditions, even under repeated impact and shear stress resulting from road traffic passing over the sheeting in the case of pavement marking applications.

Different types of enclosed-lens retroreflective sheets may be used for the present invention. Illustrative examples of enclosed-lens sheetings suitable for use in the invention include encapsulated-lens and embedded lens sheetings.

Illustrative encapsulated-lens sheetings include microsphere-based retroreflective sheetings that comprise a monolayer of transparent microspheres partially embedded in a binder layer with a reflective layer on the rear (i.e., embedded) portions thereof. An air interface is provided by a cover layer disposed in front of the microspheres. Alternatively, a cube-corner type sheeting that comprises a monolayer of cube-corner retroreflective elements having an air interface protected by a sealing layer can also be used. Cube corner type sheeting with metal coated elements may also be used. In a cube-corner type sheeting, the cover layer may be an integral part of the cube corner formations or may be an independent film. U.S. Pat. No. 4,025,159 (McGrath) discloses some microsphere type and cube-corner type encapsulated-lens retroreflective sheetings that can be used herein.

Illustrative embedded-lens sheetings include microsphere-based retroreflective sheetings that comprise (1) a monolayer of transparent microspheres whose front and rear surfaces are embedded in a transparent matrix and (2) a reflective layer disposed from the rear surfaces of the microspheres by a selected distance. As used herein, the term cover layer refers to any layer that is in front of the microspheres. U.S. Pat. No. 4,505,967 (Bailey) discloses an embedded-lens retroreflective sheeting that is particularly well suited and preferred for use herein. An illustrative example of a cube-corner, embedded-lens sheeting comprises a monolayer of cube-corners whose front and read rear surfaces are embedded in polymeric matrices and a reflective layer specularly coated or metallized on the surface of the cube-corners. It is known in the art that metallization of a cube-corner sheeting increases the entrance angularity of the sheeting.

Embedded-lens retroreflective sheetings are typically more preferred than encapsulated-lens retroreflective sheetings when used as pavement markers. It is believed that the solid construction of the embedded-lens sheeting would be more durable when subjected to traffic conditions because it has no internal voids like encapsulated-lens sheeting. Embedded-lens retroreflective sheetings are available in commercial forms that are quite durable and flexible. They are available in embodiments that provide effective retroreflective performance at higher entrance angles than many encapsulated-lens systems are capable of. Moreover, the reflective layer in many embedded-lens sheetings is aluminum and aluminum conformance layers are commonly used in pavement marking materials. This similarity may minimize any possible corrosion problems that may arise if different metals were used.

Microsphere-based enclosed-lens optical systems utilize the light bending and focusing effect of the microspheres to refract light onto a reflector member which is reflected and then refracted back toward its origin. The degree of refraction and thus the optimal placement of the specular reflector depends on the relative refractive indices of the cover layer above the microspheres, the microspheres, and the spacing layer between the microspheres and the reflector member, if any. For example, when used with cover layer and spacing layer materials having refractive index of approximately 1.5, a 2.25 refractive index microsphere will focus the light behind it at a distance of about 0.44 times its radius. The thickness of the spacing layer preferably approximates this so that light is focused onto the specular reflector. Any deviation away from these precise optical relationships will tend to result in losses of retroreflectivity of the base sheeting. Thus, the cover layer preferably remains firmly attached to the microsphere layer, the microspheres preferably are stably positioned in the polymer matrix, and all layers through which light must pass to be retroreflected are preferably clear and distortion-free. In addition, the specular reflector, typically vapor deposited aluminum, preferably remains as a substantially continuous, distortion-free layer without cracking or corroding. The spacing layer-specular layer interface preferably remains smooth and wrinkle-free. Very small changes in these optical relationships will tend to result in degradation of the retroreflective performance of the base sheeting and thus of any article made using such base sheeting. Although extremely small changes may not cause objectionable brightness loss, slight changes can severely affect these precise relationships. It is surprising that any retroreflective sheeting made using these precise optical relationships can withstand repeated traffic impact and shear stresses in combination with other effects of sunlight, rain, road oil, road sand, road salt, and vehicle emissions.

When light enters embedded-lens retroreflective sheeting at high entrance angles and passes through a microsphere, it tends to be focused at the side of the microsphere rather than at the back as happens when light is incident in a more perpendicular fashion at low incidence angles. Therefore, it is important to maintain the right spacing between the microspheres and reflective layer. As will be understood by those skilled in the art, the thickness of the space coat layer can be controlled partly by fabrication methods. When the spacing layer tends to conform hemispherically, that is, concentricly to the back side of the microspheres, optimum spacing for a variety of entrance angles can be achieved. U.S. Pat. No. 4,505,967 (Bailey) discloses embedded-lens retroreflective sheeting suitable for use herein and discusses in detail the relationship between configuration of the spacing layer and retroreflective response of the sheeting. 3M SCOTCHLITE Brand Reflective License Plate Sheeting No. 3750 is an illustrative example of a commercial retroreflective sheeting that can be used in the invention.

The cover layer, which is typically polymeric, is preferably light transmissive. It may be single layer or multilayer, e.g., further comprising a top film overlying underlying layers. Aliphatic polyurethanes are preferred materials for top films because they are clear, resistant to dirt build-up, flexible enough to conform to the road surface, bond to inorganic anti-skid particles, and typically do not discolor with exposure to ultraviolet radiation.

In some instances, selected portions of marking materials of the invention will be an exposed-lens system with other portions comprising the enclosed-lens sheeting with upwardly contoured portions as described herein. For example, a pavement marking tape of this type might comprise three longitudinal strips, the center strip being the enclosed-lens system, and the two outside strips being the exposed-lens sheeting. The exposed-lens portions may or may not be configured with first upwardly contoured portions and second lower portions if desired. Exposed-lens retroreflective systems do not provide effective retroreflective performance under wet conditions. An advantage of exposed-lens systems, however, is that they can be made in a variety of desired, typically more brilliant or true day time colors. This can be particularly useful in embodiments intended to be applied to concrete or other relatively light road surfaces where brighter colored markings are desired to achieve better contrast and visibility during the day. Although enclosed-lens sheetings that are used in the invention can be made in many colors, they typically tend to exhibit somewhat gray tone under daylight viewing conditions. Such combinations of enclosed-lens and exposed-lens systems permit separate optimization of desired properties to yield a desired resultant package of characteristics.

The reflective layer of the reflective sheet may be made of silver, pearlescent pigment materials, etc. to improve overall color of the sheeting under daylight view conditions if desired. For example, silver-based materials are typically well suited for visibility against asphalt road surfaces.

III. Upwardly Contoured Portions

As described above, portions of the retroreflective sheet have a profile with some portions upwardly contoured relative to other portions. These upwardly contoured portions, with their relatively vertical profiles provide enhanced retroreflective performance. First, when the article is oriented as a pavement marking or guard rail marking, the incidence angle of light to the first upwardly contoured portions is typically lower than the incidence angle to the second lower portions. As a result effective retroreflection is achieved. Second, the higher elevation of the upwardly contoured portions will facilitate the run off of water that might degrade retroreflective performance. Third, in the case of pavement markings, the existence of the upwardly contoured portions has been observed to result in improved adhesion to the road surface.

Upwardly contoured portions can be achieved by any means that will elevate portions of the retroreflective sheet. An illustrative example of such means is use of a configuration member. As shown in FIG. 2, upwardly contoured portions can be achieved by using configuration member 19 which elevates some portions of retroreflective sheet 14.

Configuration members may be of any shape so long as they elevate some portions of the retroreflective sheet as described herein. Typically it is preferred that the configuration member, and resultant article, be conformable to facilitate secure application to a desired substrate, e.g., road surface, guard rail face, etc. A variety of members would be suitable configuration members in the present invention.

For example, a generally planar sheet with an array of appropriately shaped protrusions (e.g., cubes, hemispheres, parallel ribs, intersecting ribs, etc.) on one side is suitable for use as a configuration member. In some embodiments, the configuration member is a mesh or netting of strands or even simply an assembled array of unconnected strands. When the article is assembled the strands define the first upwardly contoured portions and the openings between the strands define the second lower portions. Meshes of connected strands/ are typically preferred because of the relative ease of handling.

The configuration member is selected to impart the desired pattern to the first upwardly contoured portions and second lower portions. For example, the upwardly contoured portions may be in the shape of rectangles, diamonds, hexagons, curves, circles, sinusoidal ridges (e.g., nested in parallel or intersecting), etc. Each second lower portion may be essentially separated from neighboring lower portions or they may intersect, depending upon the shape of the first upwardly contoured portions.

The configuration members are typically polymeric:. Illustrative examples of polymeric materials include polyurethanes and polyolefin copolymers such as polyethylene acid copolymer consisting of ethylene methacrylic acid (EMAA), ethylene acrylic acid (EAA), ionically crosslinked EMAA or EAA.

The upward contours can be achieved by laminating a configuration member to any region beneath the retroreflective sheet. Preferably, the configuration member will be placed anywhere between the retroreflective sheet and the adhesive layer which bonds the inventive material to a desired substrate, e.g., a roadway. Preferably, the adhesive is substantially flat. The flatness provides more surface area for contact between the marking and the substrate, thereby creating a durable adhesive bond between the marking and the substrate.

Other components of the article should be sufficiently conformable so that the desired upwardly contoured profile of the enclosed-lens retroreflective sheet can be achieved. Preferably, the configuration member used will self adhere to the conformance layer, if present, as this is believed to be a more durable final product. In addition to providing the functions disclosed herein, the configuration layer may impart improved mechanical properties to the pavement marking material in similar manner as the scrims disclosed in U.S. Pat. Nos. 4,146,635 (Eigenmann) and 4,299,874 (Jones et al.). If desired, a single layer of suitable material can function as both the configuration member and conformance layer.

In one illustrative embodiment, the first upwardly contoured portions are connected such that the second lower portions are in the shapes of rectangles, e.g., a configuration member in the form of a rectangular mesh. In such embodiments, typically better retroreflective brightness is achieved if the marking material is arranged such that one pair of opposing sides of the rectangles are as nearly perpendicular to the direction of approach of motor vehicles as possible. If the material is arranged instead such that the direction of approach is parallel to a diagonal through opposite corners of the rectangle, poorer retroreflective brightness will result. If desired, the upwardly contoured portions may instead be shaped in curves, e.g., nested sinusoidal ridges, to provide a more uniform retroreflective response over a range of approach orientations.

In some embodiments, some portions of the upwardly contoured regions will be higher than other portions. For instance, in rectangular embodiments as described above, the upwardly contoured portions that are perpendicular to the main direction of travel may be raised higher than those that are parallel to the direction of travel. In this way, the higher upwardly contoured portions provide more effective retroreflective performance to approaching vehicles and the lower upwardly contoured portions permit water, if any, to drain away.

Whatever shape of contour is selected, the height of the upwardly contoured portions should be selected with distance between these portions in mind. For example, the succeeding upwardly contoured portions along a line of sight from an approaching vehicle should be placed far enough apart so as to minimize shadowing. The distance between the upwardly contoured portions (i.e., the width of the second portions) is preferably at least 3 millimeters wide. Typically, the tops of the first portions of enclosed-lens retroreflector are elevated to at least 0.1 millimeters, preferably between about 1 to 4 millimeters, higher than the second lower portions of enclosed-lens retroreflector. Closer spacing between upwardly contoured portions may be used without significant effects on retroreflective brightness but would utilize more substantial configuration members than would otherwise be optimally necessary. Likewise, larger spacing between upwardly contoured portions may be used but reduced brightness at closer viewings will result. However, brightness at larger viewings will be unaffected. As used herein, "closer viewings" refer to shorter distances between the vehicle and the inventive material, e.g., a distance of about 30 meters. "Longer viewings" refer to longer distances between the vehicle and the inventive material, e.g., a distance of about 120 meters. Those skilled in the art will be able to select and design suitable contour patterns in accordance with the invention.

In some instances, the desired upwardly contoured profile is achieved by applying a substantially planar but highly conformable retroreflective marking material to a road surface that possesses sufficient contour. Preferably the entire retroreflective material is an enclosed-lens retroreflective system. Insofar as is known, enclosed-lens retroreflective sheetings were not used in this manner previously. Preferably such markings will possess the dimensions described above and will preferably exhibit a vertical height variation between first and second portions of the retroreflective material of at least 0.1 millimeters. If the vertical height variation is too low, the advantageous retroreflective results of the invention may not be attained to satisfactory degree.

In a typical embodiment as a pavement marking for marking lanes, material of the invention will be between about 7.5 and 30 centimeters (3 and 12 inches) wide and at least 30 centimeters (12 inches) long. Usually, the pavement marking is much longer. Marking material of the invention will typically be formed in sizes conforming to standard materials. In the United States, pavement marking tapes are typically about 4, about 6, or about 8 inches wide. In Europe, pavement marking tapes are typically about 15 or 30 centimeters wide.

IV. Methods of Manufacture

One method of the invention comprises: (1) providing an enclosed-lens retroreflective sheet comprising a cover layer and a monolayer of retroreflective elements; (2) applying a conformance layer to the bottom surface of said retroreflective sheet; and (3) laminating a configuration layer to said conformance layer wherein first portions of said monolayer are arranged in an upwardly contoured profile and second portions of said monolayer are arranged in a lower, substantially planar position.

Figure 4:
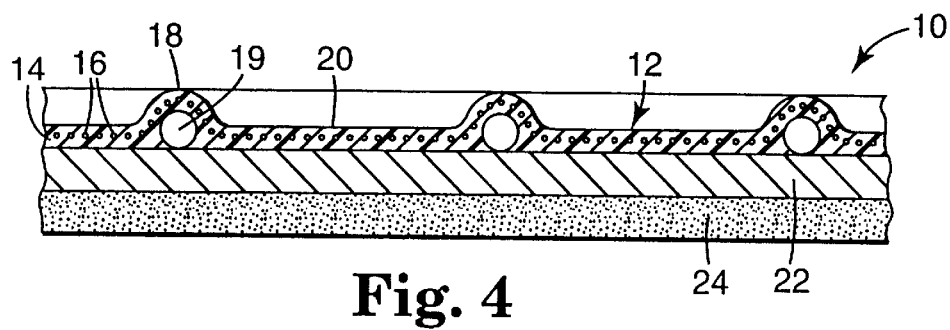

In a typical manufacturing process, either the conformance layer or the configuration member could be first applied to the retroreflective sheet. For instance, in one embodiment, a retroreflective sheet (e.g., 3M SCOTCHLITE Brand Retroreflective License Plate Sheeting No. 3750) would be applied to an aluminum conformance layer followed by lamination of a configuration member, e.g., a mesh, to yield the inventive material. Alternatively, the configuration member could be applied to the retroreflective sheet followed by lamination of the conformance layer. As shown in FIG. 4, configuration member 19 is applied to retroreflective sheet 14 followed by conformance layer 22 and optional adhesive layer 24.

Typically, an optional adhesive layer is applied to the inventive article before application to a desired substrate, e.g., a roadway. Thus, the configuration member can be placed in any layer beneath the retroreflective sheet insofar as it results in the desired configuration. Because the purpose of the configuration member is to impart an upward profile to the retroreflective sheet, its placement can vary for processing convenience.

In an alternate manufacturing process, the method comprises: (1) providing an enclosed-lens retroreflective sheet comprising a cover layer and a monolayer of retroreflective elements wherein first portions of said monolayers are arranged in an upwardly contoured profile and second portions of said monolayer are arranged in a lower, substantially planar position, and (2) backfilling the upwardly contoured profiles with a filling material. The upwardly contoured profiles can be formed in any number of ways. In one embodiment, the retroreflective sheet is gathered together in portions. In another embodiment, the retroreflective sheet is fed into embossing roll to form the upwardly contoured profiles. When the upwardly contoured portions are formed in this way, there is typically less disruption of the retroreflective assembly than if the enclosed-lens sheeting is laminated to a preformed configuration layer. Such disruption may lead to reduction of retroreflective brightness or physical integrity of the sheeting.

When these profiles are formed, they create voids or depressions in the back of the retroreflective sheet (i.e., the non-reflective side). Preferably the voids are filled with some material that provides sufficient dimensional stability to retain the described profiles. Preferably, the backfill material will be conformable so the resultant inventive material is flexible and conformable while retaining the contoured profile described herein. For example, a polymeric film may be used; it may be heated so as to flow into these structured regions.

The inventive article can be protected by using a protective coating. Such a coating has the advantages of providing abrasion and/or dirt resistance. Illustrative examples of a protective coating include, but are not limited to, ceramer coatings or crosslinked water-based polyurethane coatings.

As used herein, "ceramer" refers to a fluid comprising surface-modified colloidal silica particles dispersed in a free-radically polymerizable organic liquid. Advantages of the coating include the ability to withstand outdoor conditions with excellent resistance to moisture, light and heat; resistance to abrasion; resistance to chemical attack and coloration by automobile engine oil and carbon black (for example, carbon black of tires); desirable optical properties such as transparency; good adhesion to the refracting elements; and good flexibility. In a first step, a ceramer precursor coating composition is applied to the surface of retroreflective article, preferably including the top surface of the refracting elements and portions of the base sheet not covered by refracting elements. The coating composition comprises about 20 weight percent (wt %) to about 80 wt % of ethylenically unsaturated monomers; about 10 wt % to about 50 wt % of acrylate functionalized colloidal silica; and about 5 wt % to about 40 wt % of N,N-disubstituted acrylamide monomer or N-substituted-N-vinyl-amide monomer; wherein said percentages are weight percents of the total weight of said coating. The composition is then cured to form a retroreflective article having an abrasion-resistant, light transmissive ceramer coating. The ceramer composition can be applied by any of a number of methods known in the art, including spraying, rolling, dip coating, or knife coating. Assignee's pending U.S. patent application Ser. No. 08/444076 (filed May 19, 1995 incorporated herein by reference in its entirety) discloses the use of a ceramer on pavement markers and retroreflective sheetings.

An illustrative example of a crosslinked water-based polyurethane protective coating suitable for use in the invention comprises NEOREZ R-960 Brand polyurethane resin crosslinked with CX100 Brand crosslinking agent (both available from ICI Resins, Wilmington, Mass.). As will be understood by those skilled in the art, other water-based systems and crosslinking agents may be used in formulating a protective coating.

V. Colorants

Numerous methods may be used to add colorants to some portion of the retroreflective article. In pavement marking applications, illustrative examples of desirable colorants include, among others, white, yellow, red, and blue colors. The colorants may be light transmissive or opaque, as desired.

Typically, if the colorant is disposed within the optical path it is preferably light transmissive such that retroreflective performance is not undesirably reduced. However, it will be appreciated that in some instances it may be desirable to use an opaque colorant disposed in a location that will reduce retroreflective brightness while providing some other desired effect, e.g., more brilliant color or appearance.

Light transmissive colorants can enhance both day time and night time color of the inventive article. In pavement marking applications, as well as others, it is important that a motorist distinguish between colored markers, for example between yellow and white markings. One way to obtain night time color involves placing a light transmissive colored material in the optical path.

In one approach, color is achieved using a colored retroreflective sheet. In FIG. 2, retroreflective sheet 14 may be made with the desired color, for example yellow. In an encapsulated-lens cube-corner type sheeting, the cube-corners themselves may be colored. Another approach is to use a light transmissive colored topfilm. For example, inventive article can be made with a light transmissive yellow, red, or blue colored topfilm. Alternatively, a light transmissive colored layer can be applied onto the retroreflective sheet using conventional methods. Subsequently, a colorless topfilm could be applied to the colored retroreflective sheet. This approach has the advantage of burying the colored layer to enhance its durability. Also, multiple color layers in a pattern may be used to form desired symbols or legends.

Opaque colorants are used mainly to enhance the day time color of the inventive article and are preferably disposed outside the optical path, or at least to only selected restricted portions thereof, so as to limit undesirable reductions in retroreflective performance. Thus, an enclosed-lens retroreflective sheet that is gray colored initially, due to the aluminum reflective layer, can be changed to a desired color by the addition of an opaque colorant. For example, one approach to making a whiter article would entail applying white, opaque segments on the retroreflective sheet. Although these particular segments will not retroreflect incident light, they will increase the whiteness of the sheeting when used in small quantities. For example, pellets of white pigmented resin might be applied to the top of the enclosed-lens sheet, preferably substantially only on the lower portions between upwardly contoured portions so as to preserve the more brightly retroreflective portions.

If desired, an opaque colored layer may be transferred to selected portions of the inventive article. For example, a method for making a colored retroreflective article comprise of the following steps: (1) providing an enclosed-lens retroreflective sheet comprising a cover layer and a monolayer of retroreflective elements; (2) applying a conformance layer to the bottom major surface of the retroreflective sheet; (3) laminating a configuration member to the conformance layer to yield portions with upwardly contoured profile; (4) debossing the upwardly contoured profiles to yield a relatively flat top surface; (5) applying a colored layer onto the top surface; and (6) embossing the retroreflective sheet so that the upwardly contour portions again protrude from the retroreflective sheet.

As used herein, "debossing" refers to reverse embossing; i.e., to make a textured surface be relatively flat. Upwardly contoured portions that originally protrude from the top surface of the retroreflective sheet are pushed down so that they become relatively level with the retroreflective sheet. One way to deboss involves feeding the contoured retroreflective sheet through a set of rollers. For instance, the top contoured surface would contact a steel roll while the bottom surface would contact a rubber roll that can deform under lamination pressure. Pressure is applied to push the upwardly contoured portions down. After debossing, it is not necessary for the top surface of the sheeting to be perfectly smooth. Some surface topography is allowed. After debossing a colored layer is applied, by any convenient technique, to the top portions of the retroreflective sheet, including portions of the anti-skid particles, if any.

The composition of the colored layer, should be resistant to solvents, traffic wear, and ultraviolet light. An example of a colorant solution comprises 78 weight percent (wt %) NEOREZ R960 Brand water-based urethane resin (from Zeneca Resins, Wilmington, Mass.), 19 wt % WW3000 Brand titanium dioxide dispersion (from Heucotech Ltd., Fairless Hills, Pa.) and 3 wt % CX100 crosslinker (from Zeneca Resins, Wilmington, Mass.). As will be understood by those skilled in the art, other colored layer compositions may be used.

If desired, a combination of opaque and light transmissive colorants may be used. In this way, an article would have effective day and night time colors. Thus, any of the above combinations of opaque and light transmissive colored systems could be used. A marking comprising first segments with first upwardly contoured portions and second lower portions of enclosed-lens sheeting as described herein and second segments comprising conventional exposed-lens material can be made. The first segments will provide bright retroreflective performance in accordance with this invention, i.e., in dry and wet conditions. The second segments can be quite readily formulated to provide bright daytime color. For example, a tape marking material comprising three longitudinal segments, two outer second segments comprising conventional exposed-lens material and an inner first segment comprising the enclosed-lens material will provide an effective contrasting color with pavement in daylight and bright retroreflective performance at night, thereby increasing safety and navigational functionality at all times of day.

VII. Anti-Skid Particles

Anti-skid particles are a common component of many pavement marking articles to increase the skid resistance of the pavement marker and have been used extensively in the art. They can be placed anywhere on the surface of the article where there is contact with the tires of the vehicles.

Typically, anti-skid particles can be randomly sprinkled on to the cover layer of the retroreflective sheet while it is in a softened state. It has been found that anti-skid particles can be preferentially deposited close to the zenith of the upwardly contoured portions. For example, a web of retroreflective sheet with upwardly contoured portions could be kiss-coated with a binder composition. Kiss-coating refers to a coating method where a composition is desirably coated to only the top portions of the upwardly contoured portions; i.e., the solution is allowed to "kiss" the tops of the upwardly contoured portions. This process is done by controlling the gaps between the coating rolls and maintaining the web such that only the tops of the upwardly contoured portions are allowed to touch the coating composition. As the composition remains wet, copious amounts of anti-skid particles are sprinkled on to the web. Because the rest of the retroreflective sheet is dry, the particles adhere only to the wet areas. Excess anti-skids particles are vibrated off the web. Subsequently the web is sent through a series of ovens to dry, cure, or solidify the wet binder composition. As a result, the anti-skid particles are secured to the top regions of the upwardly contoured portions thereby providing anti-skid resistance.

VIII. Applications

Retroreflective articles of the present invention may be used advantageously in a number of different applications, particularly in wet conditions and where light is incident at high entrance angles. The articles are well suited for use as a pavement marking or horizontal sign. Because of their high retroreflectivity at both high and low entrance angles, the articles are also well-suited for vertical applications, such as use on Jersey barricades or guard rails; for curved surfaces applications such as traffic barrels, tubes, and cones; for vehicle surfaces; and for other applications where the exceptional effective entrance angularity of the article will be advantageous. For example, many embodiments of sheeting of the invention can provide effective retroreflection over all entrance angles from 0° to nearly 90°. As a result, when the sheeting is wrapped around an object such as a telephone pole or barrel, the entire surface of the sheeting that is within the line of sight can provide effective retroreflection including portions on the surface of the article that are curving away from the observer. This increases the effective retroreflective area, providing a more visible marking and thereby enhancing safety. In addition, a single marking such as a stripe on a guard rail, Jersey barrier, or wall that is parallel a first road and perpendicular to a second road that intersects the first road on the opposite side of the first road from the second road can provide very bright and effective retroreflective response visible to drivers of vehicles on both the first and second roads.

Another advantage of the present invention is that the retroreflective article is visible from any direction, as the reflectivity is high regardless of the direction of approach of the viewer to the article. This omni-directional feature makes the invention particularly well suited for horizontal signing applications, intersection markings, etc. where vehicles may approach from a number of angles.

The ease of coloring this sheeting also makes it particularly useful for horizontal signs. Transparent color layers may be applied onto the sheeting in a graphic pattern so that the retroreflected light has nearly the same coloration and pattern as is seen in a daytime viewing. It is especially useful if the ink is applied beneath the topfilm so as to be protected from road abrasion. This feature is particularly important as commonly used inks are thin, and can thus be quickly worn away by road traffic if left exposed.

Material of the invention may be wound upon itself into a roll form. The projections made by the upwardly contoured profiles are not substantial enough to interfere with wind-up.

IX. Examples

The invention will be further explained by the following illustrative examples which are intended to be non-limiting.

Wet Retroreflectivity

The wet retroreflectivity of the reflective sheetings was measured using a LTL 2000 (available from Delta Light & Optics, Lyngly, Denmark) which measures retroreflective brightness at a 88.76° entrance angle and a 1.05° observation angle. Such a configuration is similar to that which would be experienced by a driver of an average automobile 30 meters away from the reflective pavement marking. The sheeting was first laid horizontally in the test area and then flooded with a solution of tap water and 0.1 weight percent AJAX Brand dishwashing soap. The solution was allowed to run off, and brightness measurements taken within about 10 seconds. Soap is added to the water to increase surface wettability of the sheeting. The soap also better simulates the effect of rain after the reflective pavement marking has been on the road for some time, when it has been subjected to increased wettability due to the actions of sun, abrasive grit and sand, and dirt accumulations.

Retroreflective Brightness Measurement

Retroreflective brightness measurements of some samples were made according to ASTM D 4061-94. Intrinsic geometry as described in ASTM E 808-94 was used. Presentation angle was kept constant at 0 degrees; the orientation angle was maintained at −180 degrees.

The retroreflective brightness of some samples, in millicandela/meter$^2$/lux, i.e., the coefficient of retroreflective luminance, $R_L$, was measured at entrance angles and observation angles corresponding to four different observation distances for the driver of a 1989 Pontiac-Bonneville automobile as follows:

| Distance | Entrance | Observation |
|---|---|---|
| 30 m | 88.5° | 1.0° |
| 50 m | 89.3° | 0.6° |
| 80 m | 89.6° | 0.4° |
| 120 m | 89.7° | 0.25° |

Col Measurements

CAP Y is a colormetric measurement of the sheeting's whiteness. CAP Y values were measured using a Hunter Spectrophotometer (Hunter MiniScan XE) according to ASTM E 97-77.

Skid Resistance Measurements

Skid resistance is a measure of a tire's tendency to slide on the sheeting. This skid resistance is measured according to ASTM E 303.

EXAMPLE 1

An embedded-lens retroreflective article was made as follows. A thermoplastic, aliphatic, polyester polyurethane resin (MORTHANE Brand PN 3429-215 from Morton International Inc.) was extruded onto a 60 micron (2.4 mil) thick biaxially oriented polyethylene terephthalate ("PET") carrier web using a single screw extruder and a film die under normal extrusion coating techniques to obtain a 50 micron (2 mil) thick urethane film. This film was then hot laminated to the primed front surface of a high angularity retroreflective sheet, 3M SCOTCHLITE Brand Reflective License Plate Sheeting No. 3750 (the 3750 sheeting) comprising a layer of pressure sensitive adhesive covered by a release liner on the back side thereof, by passing between a rubber pressure roller and heated metal roller heated at 150° C. (300° F.) using 19 kilograms$_{force}$/centimeter width at 6.1 meters/minute (20 feet/minute). The 3750 sheeting was primed by coating with Q-THANE Brand QI 4820 polyurethane solution from K. J. Quinn & Company, Inc., thinned to gravure coating viscosity, gravure coated, and dried by passing through a series of ovens heated from 66° C. to 121° C. (150° F. to 250° F.) at a speed of about 9.1 meters/minute (30 feet/minute).

The PET carrier web and release liner were removed. The exposed adhesive on the 3750 sheeting was laminated to a 75 micron (3 mil) aluminum foil (No. 1145-0 single rolled aluminum foil from A. J. Oster Foils Inc.) using a pressure roller at room temperature to yield a laminate.

A plastic netting (product E1564, believed to be ethylene methacrylic acid (EMAA), from DuPont Canada) was hot laminated to the foil side of the composite sheeting at 3 meters/minute (10 feet/minute) between a rubber pressure roller having a Shore A Hardness of 70 under a pressure of 2050 kilograms and a 24 inch diameter metal roller at a temperature of 140° C. (280° F.). The urethane film side of the laminate contacted the rubber roll, a PET liner against the metal roller, and the netting therebetween. The plastic netting is a heat softenable material having good adhesion to metals made in diamond pattern with 10 millimeter square openings and strands having a diameter of about 0.7 to 0.8 millimeter, about 1.05 to 1.1 millimeter at junctions. Under these conditions the composite is embossed into the same pattern as the netting and the netting is firmly adhered to the back of the foil. After removing the PET liner from the composite sheeting it was observed that the netting and foil had a smooth surface indicating that the netting had effectively backfilled the embossed pattern.

Finally, a rubber based pressure sensitive adhesive was coated on the back side of the composite (over the foil/net side) and the resultant article adhered to an aluminum panel.

EXAMPLE 2

A retroreflective article was made using the following conditions.
A. EXTRUSION OF TOP FILM Polyurethane resin (MORTHANE Brand L425.91 granular resin from Morton International Inc., Seabrook, N.H.) was dried in a dehumidifying drier for 18 hours at 54° C. The resin was extruded through a 31.75 millimeters 24:1 single screw extruder using a screw speed of 80 RPM. The melt was fed through a flex lip film die and extrusion coated onto a 0.06 millimeters polyethylene terephthalate (PET) film using common extrusion coating techniques. The take away speed of the casting wheel was adjusted to yield a film which was edge trimmed to a 0.317 meter width and had a coating thickness of approximately 0.1 millimeters. The film was rolled up for use later.

B. PREPARATION OF RETROREFLECTIVE SHEET AND CONFORMANCE LAYER

3M SCOTCHLITE Brand Reflective License Plate sheeting No. 3750 was primed using an aliphatic polyurethane solution (QC 4820 from K. J. Quinn & Co.). The QC 4820 solution was first thinned using a 50/50 mixture of isopropanol and toluene to a viscosity of approximately 200 cps. This thinned solution was then applied to the top surface of the 3750 sheeting using a 150 line quadrangular gravure cylinder using common gravure coating techniques, and was dried through a series of 5 ovens with each oven about 7.6 meters in length and set temperatures of 65/79/93/107/121 (all ° C.) and a running speed of 30.5 meters per minute, and was rolled up for storage.

The primed 3750 sheeting was combined with the topfilm made in Section B using a hot lamination operation. The urethane topfilm with its PET liner was unwound and passed over a 0.61 meter diameter hot can (PET contacting the hot can) having a surface temperature of 149° C. The urethane topfilm and its liner was left on the hot can for one-fourth of the circumference of the roll before combining with the primed surface of the 3750 sheeting using an 0.2 meter diameter rubber covered pressure roll and a pressure of 1300 kilograms. The hardness of the rubber roll was measured at 55 shore A. The hot can and pressure roll had a width of 0.46 meters each. The primed 3750 sheeting was 0.311 meters wide while the topfilm was 0.317 meters wide. The rolls turned at a surface speed of 9.1 meters per minute. The laminate was left on the hot can after combining for one-half of the circumference of the roll before it was removed over a water cooled roller. The PET covering the topfilm was stripped off in line during the lamination process. The resultant composite sheeting was wound up for storage.

Subsequently, the laminate was unwound and laminated to 0.076 millimeter aluminum foil (No. 1145-0 single rolled aluminum foil available from A. J. Oster Foils Inc.) as follows. The same hot can and pressure roller equipment was used herein except that the unit was operated at room temperature. The laminate was allowed to contact the hot can. Specifically, the urethane top film touched the hot can surface while the 3750 sheeting was exposed. The release liner on the 3750 sheeting was stripped exposing the adhesive. The foil was laminated to the adhesive. This operation yielded a composite sheeting comprising a top film, a retroreflective sheet, and a foil.

C. APPLICATION OF ANTI-SKID PARTICLES

The composite sheeting unwound and passed through the same series of five ovens. The oven temperatures were set to 232/232/232/232/off (all ° C.). The web speed was set,at 12.2 meters per minute. After passing through the first oven, the web entered an area between the first and second ovens where ceramic anti-skid particles were sprinkled onto the heated web at a rate of 16.7 grams/meter$^2$. Because the web was hot, the topfilm was soft, and the anti-skid particles were lightly tacked to the surface. The web then immediately entered the remaining ovens where the web was heated allowing the anti-skid particles to become more firmly attached to the softened topfilm by action of gravity and capillary forces. The fifth zone was deliberately turned off allowing the web to cool before winding up for storage. The resultant product was an anti-skid coated sheeting.

D. LAMINATION OF CONFIGURATION MEMBER

The anti-skid coated sheeting made in Section C was unwound and laminated to an EAA (ethylene acrylic acid) netting (i.e., the configuration member) to emboss and backfill the sheeting into a three-dimensional sheeting having upwardly contoured profile. The EAA netting (made by Tensar Polytechnologies Inc., Atlanta, Ga. was made into an EAA netting using a Primacor EAA resin (available from Dow Chemical, Freeport, Tex.), believed to be a 6.5% acid level copolymer. The netting was formed into a rectangular mesh configuration having transverse direction strand thickness of about 1.25 millimeters, a longitudinal direction strand thickness of about 0.35 millimeters, and a thickness at the junction of the strands of about 2 millimeters. The transverse spacing between strands was about 6.5 millimeters. The longitudinal spacing between strands was about 20 millimeters.

The lamination of the netting was done using the same hot can lamination equipment as in Section B. Three webs were unwound and brought together in a nip created between the hot can and a pressure roller as follows: (1) a 0.025 millimeters thick PET protective film was unwound to contact the hot can; (2) the anti-skid coated sheeting with the foil side exposed was unwound to contact the pressure roll; and (3) the EAA mesh was unwound and positioned therebetween. Care was taken to ensure that the anti-skid coated sheeting and the EAA mesh remained unheated until it entered the nipping region. If the EAA mesh is inadvertently heated on the pressure rollers, it will melt and flatten out when it enters the nip; the result would be no upwardly contoured portions created on the anti-skid coated sheeting.

During the hot lamination process, only the EAA mesh was laminated to the foil side of the anti-skid coated sheeting thereby embossing and giving it an upwardly contoured profile. The PET film served as a protective layer to prevent the EAA mesh from adhering to the hot can. Once laminated at the nip, the three films were maintained at the higher temperature for about one-half the diameter of the hot can. The hot can turned at a surface speed of about 3.7 meters/minute. It had a surface temperature of 152° C. The pressure on the rubber roll was 2050 kilograms.

After leaving the hot can, the three webs contacted a water cooled roll. The PET web contacted the roll. After cooling, the PET was removed before the retroreflective article was wound up into a roll for storage.

After lamination and embossing of the composite sheeting with the netting, the retroreflective article is laminated to a rubber based pressure sensitive adhesive commonly used for adhering to asphalt and concrete road surfaces. The rubber based adhesive backed article was adhered to a road surface where it was found to retroreflect well in both dry and wet conditions.

EXAMPLE 3

A colored retroreflective article was made according to Example 2 with the following modifications. Yellow transparent dyes were added to the topfilm. Colored pellets were made which were later used when extruding the topfilm to make a colored topfilm.

The colored pellets were made by compounding on a 34 millimeter twin screw extruder, operating in a corotating mode at 450 RPM. Strands were extruded through a strand die and cooled in water. Excess water was blown off after the strands were removed from the water bath. The strands were pelletized in a Conair model 304 pelletizer. For this pellet, the formulation was 99.135 parts by weight of the L425.91 resin, 0.85 parts by weight of the Amaplast GHS (available from Colorchem International, Atlanta Georgia), and 0.015 parts by weight of the Amaplast Red LB (also available from Colorchem International).

The extrusion of the colored topfilm was the same as in Example 2, Section A. However because colored pellets were used, the resulting topfilm had a reddish-yellow color with excellent transparency. All other steps were the same as for Example 2 and the resultant yellow retroreflective article had a strong yellow daytime color and excellent retroreflected color at night in both dry and wet conditions.

EXAMPLE 4

A colored retroreflective article was made according to Example 2 except that no rubber based adhesive has been laminated to the bottom of the aluminum foil-conformance layer. This intermediate retroreflective article was further processed to add a colorant using the following steps.

After lamination of the netting in Section D, the hot can, running at room temperature, was used to deboss the raised first portions of the surface of the article into a flatter top surface. Debossing was done by placing the upwardly contoured sheeting onto the hot can surface with the contoured anti-skid coated surface against the can, and running it through the pressure roller. During this action, the profiled upwardly contoured surface and anti-skid particles are pressed into the aluminum foil which can deform because it is held against the softer rubber pressure roller surface. Running speed was 6.1 meters per minute. The pressure roller was set to 2310 kilograms. After debossing, the sheeting was wound up into a roll for storage.

The roll was unwound and printed with a white opaque gravure ink using a 100 line gravure roll. The web ran at a speed of 12.2 meters per minute. The wet printed []web was dried through the same five ovens at temperatures of 65/79/93/107/121 (all ° C.). Higher nip roll pressure than is normally used during this gravure coating operation was used in order to further deboss the sheeting and apply the ink to the areas between the first portions of the surface (valleys or flat areas of the original 3 dimensional sheeting) and anti-skid particles. The pressure roller here had a durometer of about 70 shore A, and the pressure was approximately 740 kilograms (using a 0.317 meter wide pressure roller).

The ink composition consisted of 78 wt % NEOREZ Brand R960 (available from Zeneca Resins, Wilmington, Mass.), 19 wt % WW3000 white colorant concentrate (available from Heucotech Ltd., Fairless Hills, Pa.), and 3 wt % CX100 crosslinker (also available from Zeneca). After coating and drying, the sheeting was again wound up into a storage roll.

The roll was unwound and the sheeting was re-embossed using the same technique to deboss the sheeting except the sheeting this time was applied to the hot can with the aluminum surface against the can and the printed/anti-skid coated surface out away from the hot can surface. When the roll was run through the pressure roller, the aluminum surface was re-flattened and the upwardly contoured portions of the sheeting re-embossed into nearly their original 3-dimensional shape. It was observed that the ink coated the uppermost portion of all the upwardly contoured portions, the top portion of all of the anti-skid elements, and much of the flat area of the base sheeting between the anti-skid elements and the upwardly contoured portions. However, the sides of the upwardly contoured portions were left unprinted (because they were pushed down into the aluminum foil), and a large portion of the retroreflection was retained while the daytime whiteness of the sheeting was increased.

Comparative Example A

A commercially available 3M SCOTCHLANE Brand Series No. 620 pavement marking (available from 3M Company, St. Paul, Minn.) was used for comparison purposes. 620 is a flat, exposed-lens, removable pavement marking tape comprising (1) a $TiO_2$ pigmented binder wherein microspheres and anti-skid particles are embedded, (2) an aluminum foil conformance layer, and (3) a pressure sensitive adhesive with a scrim for easier removal from the roadway.

Comparative Example B

A commercially available 3M STAMARK Brand Series No. 380 pavement marking (available from 3M Company, St. Paul, Minn.) was used for comparison purposes. 380 is a profiled, durable marking tape comprising (1) an acrylonitrile rubber based conformance layer that has been embossed to create profiles typically in the form of truncated pyramids, (2) vertical profiled regions on the truncated pyramids wherein 1.75 index of refraction microspheres are embedded and (3) a pressure sensitive adhesive for adhesion to the roadway.

TABLE 1

| Example Number | Retroflectivity, $R_1$ According to ASTM D 4061-94 | | | | Retro-reflectivity, $R_1$ LTL 2000 | | Color Cap Y | Skid Resistance |
|---|---|---|---|---|---|---|---|---|
| | 30 meter | 50 meter | 80 meter | 120 meter | DRY | WET | | |
| 2 | 1521 | 1731 | 1664 | 901 | 1489 | 1110 | 49 | 60 |
| 3 | 1038 | 1150 | 894 | 460 | 1095 | 870 | 30 | 57 |
| 4 | 1113 | 1049 | 712 | 222 | 1160 | 910 | 38 | 53 |
| A | 949 | 976 | 988 | 582 | 930 | 60 | 85 | 58 |
| B | 763 | 902 | 1020 | 1042 | 835 | 110 | 75 | 45 |

Glossary

The following definitions are used herein:

"Reference Axis" is the line normal to a retroreflective article at the point where light is incident thereto.

"Entrance Axis" (sometimes also referred to as the "Incidence Axis") is the axis defined by the path of incident light from the light source, e.g., the headlight of a motor vehicle, to the point of incidence on the article.

"Entrance Angle" (sometimes referred to as "Incidence Angle" and also as β) is the angle between the Reference Axis and the Incidence Axis.

"Observation Axis" is the axis defined by the path of retroreflected light from the point of incidence on the article to the observation point, e.g., the eyes of the driver of the motor vehicle.

"Observation Angle" (sometimes referred to as a) is the angle between the Entrance Axis and Observation Axis.

"Entrance Plane" is the plane defined by the Reference Axis and the Incidence Axis.

"Observation Plane" is the plane defined by the Observation Axis and the Incidence Axis.

"Enclosed-lens retroreflective sheet" comprises a monolayer of retroreflective elements having a top film protecting the front surfaces thereof, e.g., a monolayer of microspheres having a reflective layer in optical association with the rear surfaces thereof, sometime spaced apart by a spacer layer, and a cover layer protecting the front surfaces of the reflective elements (and in which they may or may not be embedded).

"Embedded-lens retroreflective sheet" comprises a monolayer of microspheres having a space layer and a reflective layer in optical association with the rear surface thereof and a cover layer in which the front surfaces of the microspheres are embedded. An example of a cube-corner, embedded-lens sheeting comprises a monolayer of cube-corners whose front and read rear surfaces are embedded in polymeric matrices and a reflective layer specularly coated or metallized on the surface of the cube-corners.

"Encapsulated-lens retroreflective sheet" comprises a monolayer of retroreflective elements, e.g., a monolayer of microspheres with reflective means in association with the rear surfaces and a cover layer disposed to the front surface thereof or a layer of cube corner elements with a cover layer sealed to the rear surface thereof providing an air interface wherein the cube corner elements have a specularly reflective metal layer thereon.

"High entrance angle light rays" means light rays of approximately greater than 80 degrees from vertical, and typically between 86 and 90 degrees, such as may be generated by headlights on vehicles illuminating a pavement surface or vertical barrier parallel to the road surface, for example a Jersey barrier.

Various modifications and alterations of this invention will become apparent to those skilled in the art without departing from the scope and spirit of this invention.

What is claimed is:

1. A method for making a retroreflective material comprising (a) providing an enclosed-lens retroreflective sheet having a top surface and a bottom surface and comprising a cover layer and a monolayer of retroreflective elements;

(b) applying a conformance layer to said bottom surface of said retroreflective sheet; and (c) laminating a configuration member to said conformance layer thereby creating first portions and second portions in said sheet said first portions being arranged in an upwardly contoured profile and said second portions being arranged in a lower, substantially planar position.

2. The method of claim 1 further comprising applying a protective coating on said cover layer.

3. The method of claim 1 further comprising applying antiskid particles on said protective coating.

4. The method of claim 1, wherein said configuration member is a polyolefin copolymer selected from the group consisting of ethylene methacrylic acid (EMAA), ethylene acrylic acid (EAA), ionically crosslinked EMAA, and ionically crosslinked EAA.

5. The method of claim 1, wherein said configuration member is a mesh.

6. The method of claim 1, wherein said retroreflective sheet is selected from the group consisting of embedded-lens retroreflective sheet and encapsulated-lens retroreflective sheet.

7. The method of claim 1, wherein said embedded-lens retroreflective sheet comprises a layer of transparent microspheres having front and back surfaces, a cover layer in which said front surface of said microspheres are embedded, and an associated reflective means behind said back surface of said microspheres.

8. The method of claim 1, wherein said retroreflective sheet comprises a monolayer of cube-corner elements.

9. The method of claim 1, wherein said first portions are arranged in an interconnected network.

10. The method of claim 1 further comprising applying a layer of adhesive to said bottom surface of said configuration member or to said conformance layer.

11. A retroreflective article made the process comprising the steps of:
- (a) providing an enclosed-lens retroreflective sheet having a top surface and a bottom surface and comprising a cover layer and a layer of retroreflective elements,
- (b) applying a conformance layer to said bottom surface of said retroreflective sheet; and
- (c) laminating a configuration member to said conformance layer wherein first portions of said sheet are arranged in an upwardly contoured profile and second portions of said sheet are arranged in a lower, substantially planar position.

12. The article of claim 11 further comprising a-protective coating on said cover layer.

13. The article of claim 11 further comprising antiskid particles partially embedded in said protective coating.

14. The article of claim 11, wherein said configuration member is a polyolefin copolymer selected from the group consisting of ethylene methacrylic acid (EMAA), ethylene acrylic acid (EAA), ionically crosslinked EMAA, and ionically crosslinked EAA.

15. The article of claim 11, wherein said configuration member is a mesh.

16. The article of claim 11, wherein said retroreflective sheet is selected from the group consisting of embedded-lens retroreflective sheet and encapsulated-lens retroreflective sheet.

17. The article of claim 11, wherein said embedded-lens retroreflective sheet comprises a layer of transparent microspheres having front and back surfaces, a cover layer in which said front surface of said microspheres are embedded, and an associated reflective means behind said back surface of said microspheres.

18. The article of claim 11, wherein said first portions are arranged in an interconnected network.

19. The article of claim 11 further comprising a layer of adhesive disposed on said bottom surface of said configuration member or to said conformance layer.

20. The article of claim 11 wherein each of said first portion has a top surface which is elevated at least 0.1 millimeter higher than said second portions.

* * * * *

UNITED STATES PATENT AND TRADEMARK OFFICE
CERTIFICATE OF CORRECTION

PATENT NO.   : 6,127,020
DATED        : October 3, 2000
INVENTOR(S)  : Bailey, Terry R.

It is certified that error appears in the above-identified patent and that said Letters Patent is hereby corrected as shown below:

Title page,
Item [56], FOREIGN PATENT DOCUMENTS, delete "9401987" and insert in place thereof -- 9401987.8 --.

Column 18,
Line 33, delete "[]" after "printed".

Column 20,
Line 4, delete "Read" after "and".

Signed and Sealed this

Eighteenth Day of February, 2003

JAMES E. ROGAN
*Director of the United States Patent and Trademark Office*